United States Patent
Goodman et al.

(10) Patent No.: US 8,000,584 B1
(45) Date of Patent: Aug. 16, 2011

(54) APPROACH FOR STORING DIGITAL CONTENT ONTO DIGITAL VERSATILE DISCS (DVDS)

(75) Inventors: Andrew Martin Goodman, Menlo Park, CA (US); Alan Stuart Moskowitz, Oakland, CA (US)

(73) Assignee: TiVo Inc., Alviso, CA (US)

( * ) Notice: Subject to any disclaimer, the term of this patent is extended or adjusted under 35 U.S.C. 154(b) by 1663 days.

(21) Appl. No.: 10/958,678

(22) Filed: Oct. 4, 2004

Related U.S. Application Data (63) Continuation-in-part of application No. 10/425,331, filed on Apr. 28, 2003, which is a continuation-in-part of application No. 10/420,371, filed on Apr. 21, 2003, now Pat. No. 7,200,321.

(60) Provisional application No. 60/375,623, filed on Apr. 26, 2002, provisional application No. 60/508,769, filed on Oct. 2, 2003.

(51) Int. Cl.
*H04N 5/84* (2006.01)
(52) U.S. Cl. .......................... 386/335; 386/334; 386/341
(58) Field of Classification Search .............. 386/95–96, 386/125–126, 83
See application file for complete search history.

(56) References Cited

U.S. PATENT DOCUMENTS

| | | | |
|---|---|---|---|
| 5,905,841 A | 5/1999 | Peters et al. | |
| 5,907,658 A * | 5/1999 | Murase et al. | 386/95 |
| 6,078,005 A | 6/2000 | Kurakake et al. | |
| 6,112,010 A | 8/2000 | Koyama et al. | |
| 6,259,858 B1 * | 7/2001 | Ando et al. | 386/95 |
| 6,263,152 B1 * | 7/2001 | Hisatomi et al. | 386/70 |
| 6,317,141 B1 | 11/2001 | Pavley et al. | |
| 6,317,885 B1 | 11/2001 | Fries | |
| 6,363,212 B1 * | 3/2002 | Fujinami et al. | 386/104 |
| 6,424,793 B1 * | 7/2002 | Setogawa et al. | 386/95 |
| 6,683,649 B1 | 1/2004 | Anderson | |
| 7,149,961 B2 | 12/2006 | Harville et al. | |

(Continued)

FOREIGN PATENT DOCUMENTS

JP 10-322613 12/1998

(Continued)

OTHER PUBLICATIONS

International Bureau, "Notification Concerning Transmittal of International Preliminary Report on Patentability (Chapter I of the Patent Cooperation Treaty)," PCT/US2004/010913, 5 pages, dated Nov. 3, 2005.

(Continued)

*Primary Examiner* — Jamie Atala
(74) *Attorney, Agent, or Firm* — Hickman Palermo Truong & Becker LLP (57) ABSTRACT

According to an approach for storing digital content onto a DVD, digital content is received from a source, such as a DirecTV link, an over the air (OTA) broadcast, over a cable television link, or any other type of communications link, including the Internet. The digital content is formatted to comply with the MPEG standard to create MPEG digital content and stored on a non-volatile storage. Text-based information is received that describes one or more attributes of the received digital content. A set of DVD subpicture graphics is generated based upon the text-based information. The set of DVD subpicture graphics may represent a structure that can be navigated by a user when the DVD is played. The MPEG digital content is retrieved from the non-volatile storage, converted to DVD format and stored on the DVD with the DVD subpicture graphics.

40 Claims, 5 Drawing Sheets

U.S. PATENT DOCUMENTS

| | | | |
|---|---|---|---|
| 7,178,107 B2* | 2/2007 | Sezan et al. | 715/719 |
| 2001/0042043 A1 | 11/2001 | Shear et al. | |
| 2002/0088011 A1 | 7/2002 | Lamkin et al. | |
| 2002/0118955 A1* | 8/2002 | Maruyama et al. | 386/95 |
| 2002/0131767 A1 | 9/2002 | Auwens et al. | |
| 2003/0016951 A1 | 1/2003 | Jakel et al. | |
| 2003/0138236 A1 | 7/2003 | Um et al. | |
| 2003/0219227 A1 | 11/2003 | Otala et al. | |
| 2004/0013406 A1 | 1/2004 | Barton et al. | |

FOREIGN PATENT DOCUMENTS

| | | |
|---|---|---|
| JP | 2003-018549 | 1/2003 |

OTHER PUBLICATIONS

Current Claims, PCT/US2004/010913, 5 pages.

State Intellectual Property Office of P.R.C., "Notification of the First Office Action", Application No. 200480013487.1, dated Feb. 29, 2008, 5 pages.

European Patent Office, "Communication pursuant to Article 94(3) EPC", Application No. 04759815.6-1247, dated May 5, 2008, 5 pages.

Claims, Application No. 04759815.6-1247, 7 pages.

"DVD Book Construction", DVD Format/Logo Licensing Corporation, retrieved from internet : http://www.dvdfllc.co.jp , Retrieved on May 5, 2006, 1 page.

"How to Order a DVD Book", DVD Format/Logo Licensing Corporation, retrieved from internet : http://www.dvdfllc.co.jp/howto/howto.htm , Retrieved on Mar. 3, 2004, 1 page.

Taylor, Jim, "DVD Demystified", $2^{nd}$ Edition, McGraw-Hill, 2001, 4 pages.

International Search Report and Written Opinion, International Application No. PCT/US04/10913 dated Sep. 2, 2005, (8 pgs)—attached.

Current Claims in PCT application No. PCT/US04/1913 (7 pgs)—attached.

Japanese Patent Office, "Official Notice for Preliminary Rejection", Application No. 2006-509833, dated Sep. 10, 2008, 9 pages.

Claims, Application No. 2006-509833, 8 pages.

English Translation of Japanese "Official Notice for Preliminary Rejection" dated Sep. 3, 2009, application No. 2006-509833, Applicant: TiVo Inc., 2 pages.

Current Claims for Japanese application No. 2006-509833, amended on Feb 10, 2009, 7 pages.

* cited by examiner

| NAV PACKET 602 | VID PACKET 604 | AUD PACKET 606 | VID PACKET 604 |

· · ·

| SUB PACKET 608 | HIGH PACKET 610 | STILL PACKET 612 | RT1 PACKET 614 |

APPROACH FOR STORING DIGITAL CONTENT ONTO DIGITAL VERSATILE DISCS (DVDS)

CLAIM OF PRIORITY

This application is a continuation-in-part of U.S. patent application Ser. No. 10/425,331, filed on Apr. 28, 2003, which is a continuation-in-part of U.S. patent application Ser. No. 10/420,371, filed on Apr. 21, 2003 now U.S. Pat. No. 7,200,321, which claims the benefit of U.S. Provisional Patent Application Ser. No. 60/375,623, filed on Apr. 26, 2002. This application also claims the benefit of U.S. Provisional Patent Application Ser. No. 60/508,769, filed on Oct. 2, 2003. The contents of all of these applications are incorporated herein in their entirety for all purposes.

FIELD OF THE INVENTION

This invention relates generally to storing content on non-volatile storage media, and more specifically, to an approach for storing digital content onto digital versatile discs (DVDs).

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Digital versatile discs, sometimes also referred to as digital video discs (DVDs), have become as popular as VCR tapes and may soon replace VCRs. The manufacturers of DVDs envision the DVD to replace not only VCR tapes, but CDs, laserdiscs, and video game cartridges. Currently, DVDs offer a platform that can store up to 15.9 GBs of audio and video (A/V) data on a single disc. However, a typical recordable DVD can only store approximately 4.7 GBs of data.

More recently, digital video recorders (DVRs) have emerged in the marketplace. There are a number of technology trends that are continuing to expand the opportunities for DVR functionality. These trends, whose initial existence directly led to the invention of the DVR, include the increasing density of gates on semiconductor media and the increasing density of magnetic storage on hard drive platters.

As content broadcasters transition to pure digital broadcasts, the entire pathway from the broadcast station to the viewer will be digital. DVRs are on the forefront of offering digital storage and display solutions to the viewer. DVRs offer the viewer increased control of the storage and playback of recorded broadcast programs. The user has the ability to pause and rewind through live broadcast programs which was never feasible using VCRs.

Even though the hard disks in a DVR can be very large (hundreds of gigabytes), the ability to backup and play stored program material using a DVD player/recorder was not considered until recently. This combination offers the DVR user the advantage of creating a large library of program material stored on DVDs. One problem is how to store content onto a DVD that may be received in a non-DVD compliant format. Another problem is how to store content onto a DVD in a manner that allows a user to use the functionality provided by DVRs. For example, when a DVD that conforms to the DVD standard is played, it is very difficult to perform special effects such as fast forward and rewind through the program material with the same granularity as with program material stored on a DVR. Moreover, it is impossible to go to arbitrary positions within the DVD content without having to perform multiple reads of the content. Each read contributes a high latency. To perform the same type of DVR special effects on a standard DVD player requires expensive reads of sections of the DVD disc and the granularity would not be up to the standards of a DVR. In view of the foregoing, there is a need for an approach for creating DVDs containing A/V content that addresses the problems above.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE
III. CREATING DVD DIRECTORY STRUCTURES
IV. PROCESSING TEXT-BASED INFORMATION
V. WRITING DIGITAL CONTENT TO DVDs
VI. IMPLEMENTATION MECHANISMS

I. Overview

Figure 1:
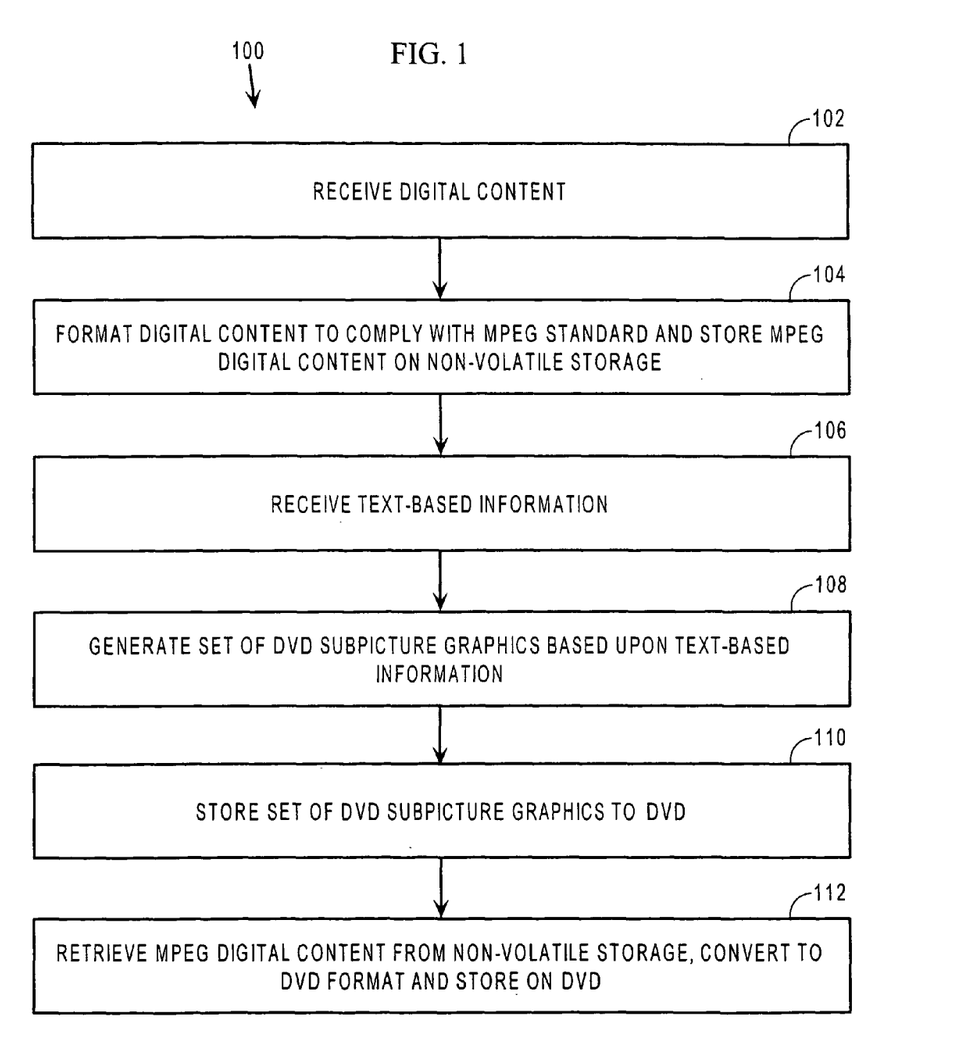
FIG. 1 is a flow diagram that depicts an approach for storing digital content on DVDs in accordance with an embodiment of the invention.

FIG. 1 is a block diagram 100 that depicts an approach for storing digital content onto a DVD. The digital content may include any type of digital data, for example, video and/or audio data. In step 102, digital content is received from any of a variety of sources. For example, the digital content may be received over a satellite link such as a DirecTV link, an over the air (OTA) broadcast, over a cable television link, or any other type of communications link, including the Internet. The digital content may be received in a variety of formats, depending upon the particular application, and the approach described herein is not limited to any particular format. Example formats include, without limitation, DirecTV, digital video broadcast satellite (DVBS), digital video broadcast terrestrial (DVBT), DVB for cable and any other numerous proprietary formats.

In step 104, the digital content is formatted to comply with the MPEG standard to create MPEG digital content and the MPEG digital content is stored on a non-volatile storage, such as one or more hard disks in a DVR. Formatting the received digital content to conform to the MPEG standard may involve different types of processing, depending upon the format of the received digital content, which is described in more detail hereinafter.

In step 106, text-based information is received that describes one or more attributes of the received digital content. The text-based information may be received separate (out of band) from the digital content, for example, in a separate data stream, or in separate packets in a DVB stream, and may be in a different format than the received digital content.

In step 108, a set of DVD subpicture graphics is generated based upon the text-based information. According to one embodiment of the invention, the set of DVD subpicture graphics represents a structure that can be navigated by a user when the DVD is played. For example, the set of DVD subpicture graphics may represent a menu structure that a user can navigate when the DVD is played. In step 110, the set of DVD subpicture graphics is stored onto a DVD.

In step 112, the MPEG digital content is retrieved from the non-volatile storage, converted to DVD format and stored on the DVD with the DVD subpicture graphics. According to one embodiment of the invention, the MPEG digital content is converted to DVD-VR format and stored on the DVD.

This approach for storing digital content onto a DVD allows a digital content stream from a satellite broadcast to be stored onto a DVD in compliance with a DVD format. Accompanying the digital content on the DVD is text-based information that has been converted to DVD subpicture graphics. The DVD subpicture graphics may be used to provide a menu structure that a user can navigate when playing the DVD. The DVD subpicture graphics also allow the text-based information to be conveyed to the user in a manner that enhances the user experience.

The aforementioned steps may be performed in a different order than depicted in FIG. 1 and described above and more or fewer steps may be performed, depending upon the requirements of a particular application. For example, the text-based information may be received prior to the digital content. As another example, the generation of the set of DVD subpicture graphics may be performed prior to or during the storing of the MPEG digital content to the non-volatile storage. Various other combinations are possible.

II. Architecture

Figure 2:
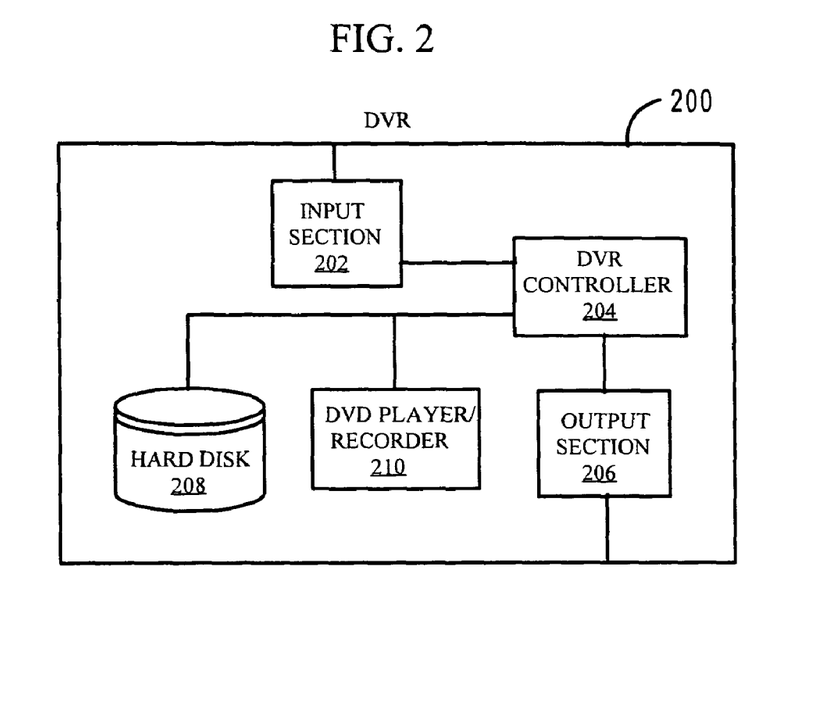
FIG. 2 is a block diagram that depicts an example digital video recorder (DVR).

FIG. 2 depicts an example digital video recorder (DVR) 200 configured to store digital content to a DVD in accordance with an embodiment of the invention. Such a DVR is described in U.S. Pat. No. 6,233,389 owned by the Applicant, which is hereby incorporated herein by reference in its entirety for all purposes, and U.S. patent application Ser. No. 10/418,646, filed on Apr. 18, 2003 and entitled Digital Video Recorder System with an Integrated DVD Recording Device, also owned by the Applicant and incorporated herein by reference in its entirety for all purposes. For purposes of explanation, the approach is described in the context of a DVR, but the invention is not limited to the DVR context and may be implemented on any type of mechanism, electronics or computing architecture.

DVR 200 is configured with an input section 202, a DVR controller 204, an output section 206, a hard disk 208 and a DVD player/recorder 210. DVRs such as DVR 200 may be configured with a wide variety of other components, depending upon the requirements of a particular implementation, and these other components are not depicted in FIG. 2 for purposes of explanation only.

Input section 202 accepts data in a multitude of forms, for example, National Television Standards Committee (NTSC) or PAL broadcasts, and digital forms such as Digital Satellite System (DSS), Digital Broadcast Services (DBS), Advanced Television Standards Committee (ATSC), DirecTV, digital video broadcast satellite (DVBS) and digital video broadcast terrestrial (DVBT). DBS, DSS and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. Input section 202 generates and provides MPEG streams to DVR controller 204.

An MPEG-2 transport multiplex supports multiple programs in the same broadcast channel, with multiple video and audio feeds and private data. Input section 202 tunes the channel to a particular program, extracts a specific MPEG program out of it, and provides it to the rest of the system. Analog TV signals are encoded into a similar MPEG format such that the remainder of the system is unaware of how the signal was obtained. Additional information may be modulated into the Vertical Blanking Interval (VBI) of the analog TV signal in a number of standard ways. For example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals are decoded by input section 202 and passed to the other parts of the system as if they were delivered via an MPEG-2 private data channel.

DVR controller 204 manages the streams received from input section 202 and directs the streams to the hard disk 208 or DVD player/recorder 210, and output section 206. DVR controller 204 buffers the MPEG stream into memory. It then performs two operations if the user is watching real time TV: the stream is sent to the output section 206 and it is written simultaneously to hard disk 208. Otherwise it stores the MPEG stream on hard disk 208.

As DVR controller 204 stores the MPEG stream onto hard disk 208, it creates an index table. DVR controller 204 reads the MPEG stream and records the location of each elementary stream element (e.g., I, P, and B frames) and the beginning of every group of pictures (GOP) header and the closest time stamp in an index table. The index table allows a jump to any arbitrary target time within a program. If the target time matches a time stamp in the index table, then a jump is made to the corresponding frame. If the target time does not match a time stamp in the index table, then the two timestamps that are the closest to the target time are identified and linear interpolation is used to determine the location to jump to in the stream.

For jumps relative to a current play location, linear interpolation provides a relative jump value from the current location. This ensures that the imprecision of the positioning will not make a jump forward go backward or simply go forward by too much or little. This latter method may be used for fast-forward or rewind special effects. It may also be used when the absolute time that the system is supposed to jump to is close to the current point.

Output section 206 receives MPEG streams as input and produces an analog TV signal to a TV monitor 107 according to the NTSC, PAL, or other required TV standards or a digital signal for a digital monitor. Output section 206 may contain, for example, an MPEG decoder, an On-Screen Display (OSD) generator, an analog TV encoder, a digital display encoder (e.g., DVI, HDMI, etc.), and audio logic. An OSD generator allows DVR controller 204 to supply images that will be overlaid on top of the resulting output signal.

DVR controller 204 allows a user to playback program material stored on hard disk 208 and also stored on a DVD inserted into DVD player/recorder 105. DVD player/recorder 105 records program material stored on hard disk 208 onto a recordable DVD. In operation, a user inserts a DVD into DVD player/recorder 210. The user selects the program material to be viewed via DVR controller 204. DVR controller 204 locates the program material on the DVD and extracts and streams the MPEG program video and audio from DVD player/recorder 210 output section 206. Output section 206 provides the MPEG streams to a digital display or converts the MPEG streams to an analog TV signal and provides the analog signal to a TV monitor. The user views the program material via the digital display or TV monitor.

When one compares a DVR and a DVD player side-by-side, there is no apparent quality difference in the picture presented to the user. This is because both the DVR and the DVD player both follow the MPEG standard. The difference is in the ability to navigate through the program material. The DVR smoothly transitions between frames of the program material while performing special effects on the material, e.g., fast forward, reverse, play, pause, fast/slow play, indexing, and fast/slow reverse play. As noted above, the DVD player cannot make smooth transitions between frames of the program material because the DVD player is not able to timely access the DVD material.

III. Creating DVD Directory Structures

Figure 3:
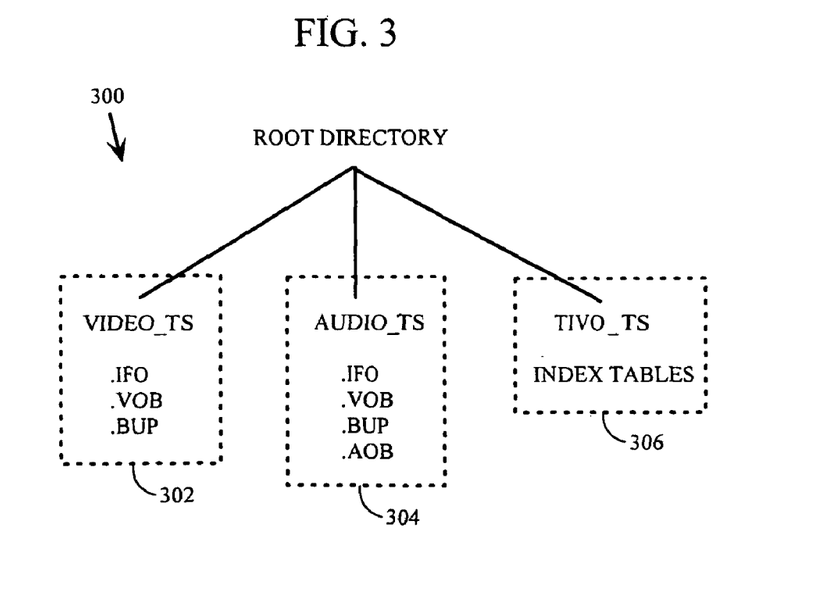
FIG. 3 depicts an example DVD directory structure.

DVR 200 is also configured to generate and write various directory structures that conform to the DVD standard. DVDs are organized using the Universal Disk Format (UDF) bridge format. DVR controller 204 creates the DVD standard navigation and control information and provides the information to DVD player/recorder 210. FIG. 3 depicts an example DVD directory structure 300 that includes a VIDEO_TS directory 302 and an AUDIO_TS directory 304. DVR controller 204 also writes .VOB (video object file), .AOB (audio object file), .IFO (information file object), and .BUP (backup file) files to VIDEO_TS directory 302 or AUDIO_TS directory 304. The VIDEO_TS directory 302 is for DVD Video or DVD Audio discs with video. The AUDIO_TS directory 304 is for DVD-audio only discs.

According to one embodiment of the invention, DVR controller 204 is configured to add a new directory 306 to the DVD structure. Directory 306 may be any name that is not reserved, for example, TIVO_TS. DVR controller 204 creates the new directory 306 on a DVD in DVD player/recorder 210. DVR controller 204 then writes index tables for the stream(s) into directory 306. According to one embodiment of the invention, each media stream file in the VIDEO_TS directory 302 and AUDIO_TS directory 304 directories has a corresponding index table file in the new directory 306. Alternatively, the index table files may be stored in the respective VIDEO_TS directory 302 and AUDIO_TS directory 304. According to one embodiment of the invention, index data is written to a DVD in DVD navigation packets.

In operation, when a DVD created as described herein is inserted into DVD player/recorder 210, DVR controller 204 uses the index table files stored on the DVD to enable full special effects functionality. The index table gives DVD player/recorder 210 full random access to the DVD to perform special effects on the program material. DVR controller 204 simply refers to the index table and jumps to the addresses in the index table or uses the linear interpolation method as described above for jump points not in the index table. Smooth fast forward and reverse special effects are achieved by retrieving frames addressed through the index table. Any type of jump navigation (e.g., instant replay of the last ten seconds) is also achieved via the index table. A DVD player that is not configured to access the index tables will play the DVD as it would a normal DVD. The approach provides a seamless user experience between DVR content and DVD content on a combination device that incorporates both features.

IV. Processing Text-Based Information

DVR 200 may be configured to process any type of digital content, for example the various types of digital content described herein, depending upon the requirements of a particular implementation. DVR 200 is also configured to generate DVD subpicture graphics based upon the received text-based information, and store the DVD subpicture graphics information on a DVD. The text-based information may include a wide variety of information, depending upon what is included in the digital content. Examples include, without limitation, program names or titles, names of actors, artists, directors, genres, ratings, summaries, etc. The DVD subpicture graphics are generated using a font rendering tool to render the text into a frame buffer. The data is then transformed into DVD subpicture graphic data. According to one embodiment of the invention, DVD subpicture graphics are stored in the directory structure on a DVD and in particular, in .IFO files.

The DVD subpicture graphics may be used in a variety of ways to provide enhanced functionality and to improve the user experience. For example, the DVD subpicture graphics may provide a hierarchical menu structure, e.g., in the form of an electronic program guide, that can be navigated by a user. The hierarchical menu structure identifies the digital content stored on the menu, e.g., by program name or song name. The user can select a program item to be played or select a program item to obtain additional information about the selected program item.

For example, DVR controller 204 may receive a list of program names from a DirecTV stream. DVR controller 204 then generates a set of graphical objects in DVD subpicture graphic format, where each graphical object is a graphical representation of one of the program names. The set of graphical objects is stored on the target DVD and during playback, is displayed to the user. The user uses navigation controls to navigate among and select the graphical objects. The user may select a particular graphical object to obtain additional information about the corresponding program or to play the corresponding program. Selecting a particular graphical object to obtain additional information may cause additional graphical objects to be displayed that convey textual information to the user, e.g., details about the corresponding program. Thus, a hierarchy of graphical objects may be generated and stored on the target DVD based upon received text-based information.

Figure 4:
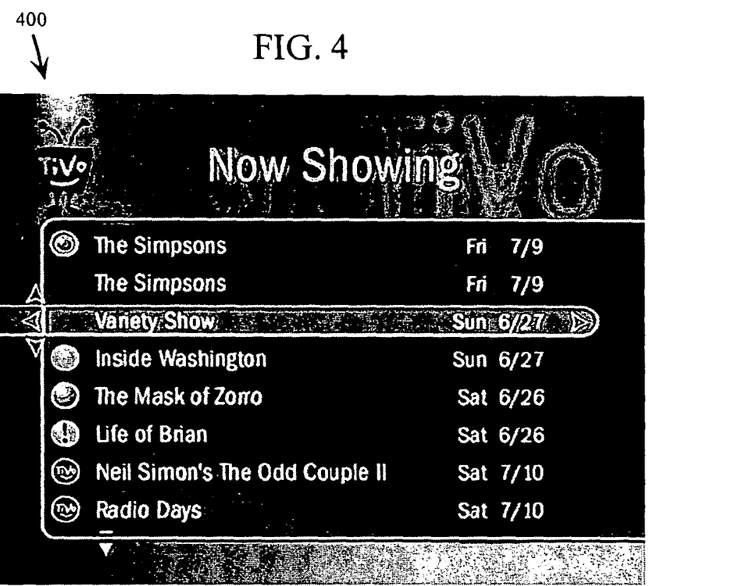
FIG. 4 depicts an example set of DVD subpicture graphics displayed on a monitor or TV in the form of a program list that may be navigated by a user.
Figure 5:
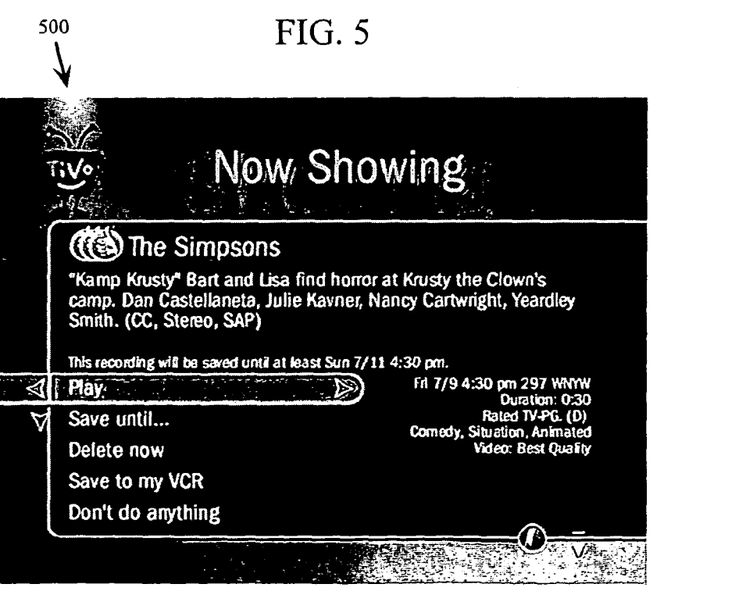
FIG. 5 depicts another example set of DVD subpicture graphics that provide detailed program information.

FIG. 4 depicts an example set of DVD subpicture graphics 400 displayed on a monitor or TV in the form of a program list that may be navigated by a user. FIG. 5 depicts another example set of DVD subpicture graphics that provide detailed program information 500.

V. Writing Digital Content to DVDs

Figure 6:
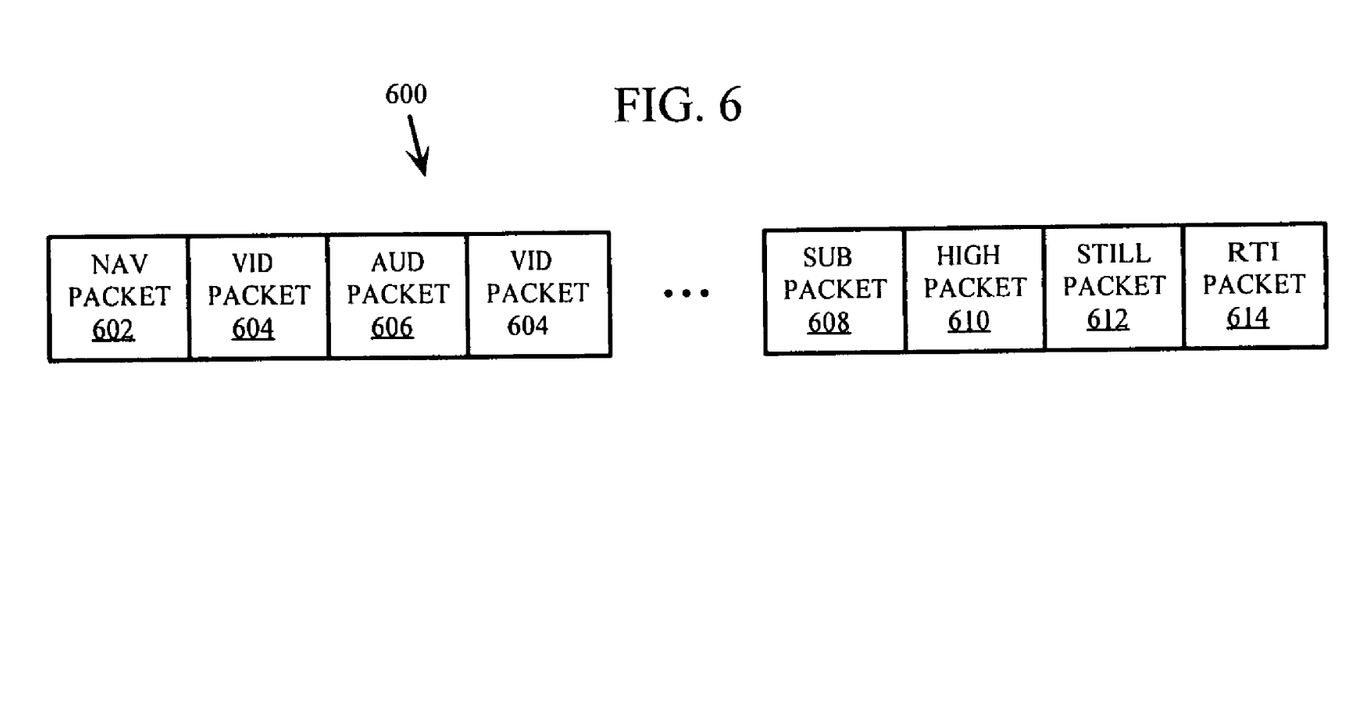
FIG. 6 depicts the contents of a conventional video object unit (VOBU).

According to one embodiment of the invention, DVD-Video and DVD-Audio information is arranged on a DVD in Video Object Units (VOBUs). FIG. 6 depicts the contents of a conventional VOBU 600. For DVD-video content, VOBU 600 includes a navigation packet 602, one or more video packets 604, one or more audio packets 606 and one or more subpicture packets 608. For DVD-audio content, VOBU 600 includes highlight packets 610, still packets 612 and RTI text packets 614. A VOBU 600 does not always have to contain video content.

Navigation packet 602 contains information that determines how the physical data is accessed. Video packets 604 and audio packets 606 carry the video and audio content in recording order. Subpicture packets 608 overlay the video content for indicating subtitles, captions, menus, etc. The video VOBUs are compliant with the MPEG program stream standard. VOBUs that contain video are organized as an MPEG group of pictures (GOP). The approach described herein for creating DVDs does not affect the standard layout of the VOBU streams, but rather, works in conjunction with and takes advantage of the DVD standard.

As described herein, A/V data is stored on hard disk 208 in MPEG format. Some DVD formats may not be completely compatible with the MPEG format and therefore in some situations, A/V data read from hard disk 208 needs to be formatted before being written to a DVD. For example, suppose that a target DVD is to be formatted in the DVD-VR format. In this situation, data retrieved from hard disk 208 must be formatted to be compliant with the DVD-VR standard. This may include, for example, reformatting MPEG GOPs into GOPs that conform to the DVD-VR requirement of having between twenty four and thirty six frames. MPEG GOPs may have more than thirty six frames per GOP and those that do must be segmented into shorter GOPs that have no more than thirty six frames. This may include having to generate additional intraframes (I-frames) based upon prior I-frames, predicted frames (P-frames) and bidirectional frames (B-frames) using any number of known techniques for constructing I-frames. Formatting the MPEG data may also include generating navigation packets that are DVD-VR compliant. Digital data retrieved from hard disk 208 may also not have a valid vertical and horizontal resolution supported by the DVD-VR standard and this may also need to be adjusted before the data can be written to a DVD.

Other formatting may be performed for audio content. For example, the MPEG standard allows for up to sixteen sound tracks while the DVD-VR standard specifies a maximum of eight soundtracks. As another example, a data stream received from a satellite transmission may include audio data formatted according to MPEG1-Layer 2 or AC-3 with no sampling rate restriction. The DVD-VR standard specifies that audio data must be in AC-3 format sampled at 48,000 samples per second. Thus, audio data may need to be reformatted. Furthermore, other data may be generated that is specific to audio content. For example, ID3 tags may be generated and stored on the DVD.

Consider the following example. Input section 202 receives a DirecTV broadcast that conforms to the DirecTV format, which may not be MPEG compliant in one or more respects. For example, the received DirecTV broadcast may not be MPEG compliant at the transport layer and DirecTV SD video may not be compliant with the MPEG packetized elementary stream (PES) format. Input section 202 generates and provides an MPEG compliant stream to DVR controller 204. DVR controller 204 stores the MPEG data on hard disk 208. When a DVD-VR compliant DVD is to be created, DVR controller 204 retrieves the MPEG data from hard disk 208, formats the MPEG data into DVD-VR compliant data, and stores the DVD-VR compliant data to a DVD. DVR controller 204 may also generates both index data and DVD subpicture graphics data as described herein, and stores this data on the DVD.

The index data and DVD subpicture graphics data may be stored to a DVD either before or after the DVD-VR compliant content data, depending upon the requirements of a particular implementation. Although embodiments of the invention have been described herein in the context of generating DVD-VR compliant content after the MPEG compliant content is retrieved from hard disk 208 when the DVD-VR compliant DVD is to be prepared, the DVD-VR compliant content may be prepared at other times. For example, the MPEG compliant data may be converted to DVD-VR compliant data before being stored on hard disk 208. This approach may be used in situations where it is known that the MPEG compliant form of the content will not be needed. Alternatively, both MPEG compliant and DVD-VR compliant forms of the content may be stored on hard disk 208. This approach consumes more storage on hard disk 208, but may be useful in situations where there is plenty of available storage and/or it is known that the DVR-VR compliant data will soon be written to the DVD and subsequently deleted from hard disk 208.

VI. Implementation Mechanisms

Although embodiments of the invention have been described herein in the context of a DVD mechanism incorporated into a DVR, the approach is applicable to DVD mechanisms that are external to the DVR.

Figure 7:
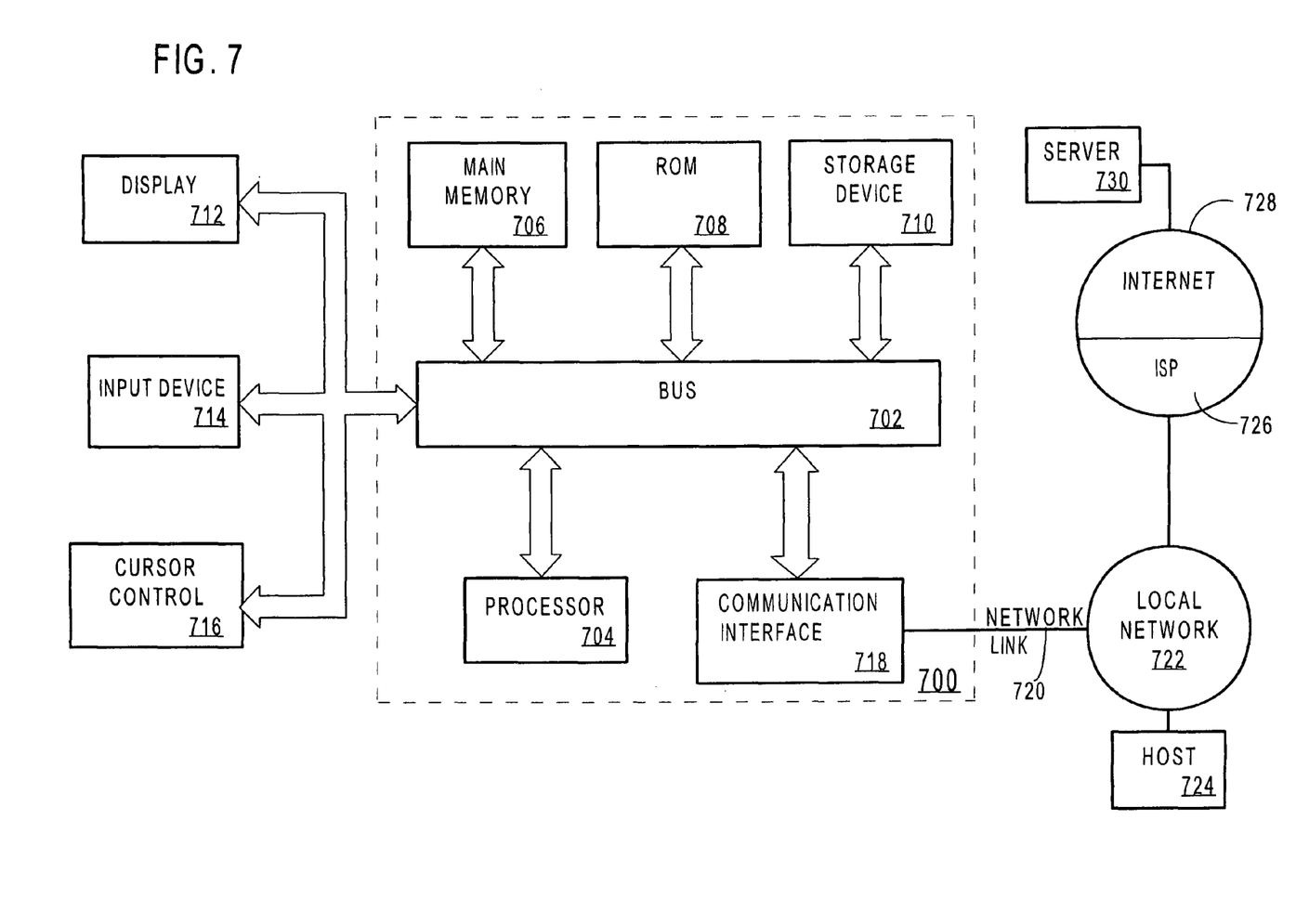
FIG. 7 is a block diagram of a computer system on which embodiments of the invention may be implemented.

The approach described herein for storing digital data on DVDs may be implemented on a variety of electronic and computer architectures and may be implemented in hardware, software, or any combination of computer hardware and software, depending upon the requirements of a particular implementation. FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for creating a Digital Versatile Disc (DVD), the method comprising:
    retrieving, from a hard disk, MPEG data comprising a plurality of video content that conforms to the MPEG standard;
    receiving text data that describes one or more attributes for each of the plurality of video content, the text data including at least program names and program summaries for each of the plurality of video content;
    generating DVD subpicture graphics data for each of the plurality of video content based upon the text data, the subpicture graphics data including at least graphical renderings of each of the program names and program summaries;
    converting the plurality of video content into DVD data that conforms to a DVD format;
    storing the DVD subpicture graphics data onto a DVD as part of a navigation interface for the plurality of digital content, the DVD subpicture graphics data comprises forming a hierarchical menu structure that includes at least a menu that identifies at least first video content by at least a program name, and a menu that identifies the first video content by at least a program summary; and
    storing the DVD data onto the DVD.

2. The method as recited in claim 1, wherein the DVD format is the DVD-VR format and converting the plurality of digital content into DVD data that conforms to the DVD format includes converting the plurality of digital content into DVD-VR data that conforms to the DVD-VR format.

3. The method as recited in claim 2, wherein converting the plurality of digital content into DVD-VR data that conforms to the DVD-VR format includes reformatting an MPEG Group of Pictures having more than thirty six display fields into two or more Groups of Pictures that each have at most thirty six display fields.

4. The method as recited in claim 3, wherein reformatting an MPEG Group of Pictures having more than thirty six display fields into two or more Groups of Pictures that each have at most thirty six display fields includes constructing one or more intraframes (I-frames) based upon preceding predicted frames (P-Frames) and bidirectional frames (B-frames).

5. The method as recited in claim 2, further comprising generating one or more navigation packets that conform to the DVD-VR standard.

6. The method as recited in claim 1, further comprising:
receiving, from a satellite link, digital data that does not conform to the MPEG standard;
converting the digital data to the MPEG data; and
storing the MPEG data onto the hard disk.

7. The method as recited in claim 6, wherein the received digital data and text data conforms to the DirecTV format.

8. The method as recited in claim 1, further comprising:
generating index data that indicates, for each of a plurality of frames contained in the DVD data, a location and timestamp, wherein one or more of the plurality of frames are not at chapter boundaries; and
storing the index data to the DVD.

9. The method as recited in claim 8, wherein one or more of the plurality of frames are group of pictures (GOP) headers.

10. The method as recited in claim 8, wherein storing the index data to the DVD includes storing the index data into a directory structure on the DVD.

11. The method as recited in claim 8, wherein the index data is stored on the DVD in DVD navigation packets.

12. The method as recited in claim 8, wherein the DVD subpicture graphics data is stored onto the DVD before the DVD data.

13. A non-transitory computer-readable storage medium for creating a Digital Versatile Disc (DVD), the computer-readable medium carrying instructions which, when executed by one or more processors, cause performance of:
retrieving, from a hard disk, MPEG data comprising a plurality of video content that conforms to the MPEG standard;
receiving text data that describes one or more attributes for each of the plurality of video content, the text data including at least program names and program summaries for each of the plurality of video content;
generating DVD subpicture graphics data for each of the plurality of video content based upon the text data, the subpicture graphics data including at least graphical renderings of each of the program names and program summaries;
converting the plurality of video content into DVD data that conforms to a DVD format;
storing the DVD subpicture graphics data onto a DVD as part of a navigation interface for the plurality of digital content, the DVD subpicture graphics data comprises forming a hierarchical menu structure that includes at least a menu that identifies at least first video content by at least a program name, and a menu that identifies the first video content by at least a program summary; and
storing the DVD data onto the DVD.

14. The non-transitory computer-readable storage medium as recited in claim 13, wherein the DVD format is the DVD-VR format and converting the plurality of video content into DVD data that conforms to the DVD format includes converting the plurality of video content into DVD-VR data that conforms to the DVD-VR format.

15. The non-transitory computer-readable storage medium as recited in claim 14, wherein converting the plurality of video content into DVD-VR data that conforms to the DVD-VR format includes reformatting an MPEG Group of Pictures having more than thirty six display fields into two or more Groups of Pictures that each have at most thirty six display fields.

16. The non-transitory computer-readable storage medium as recited in claim 15, wherein reformatting an MPEG Group of Pictures having more than thirty six display fields into two or more Groups of Pictures that each have at most thirty six display fields includes constructing one or more intraframes (I-frames) based upon preceding predicted frames (P-Frames) and bidirectional frames (B-frames).

17. The non-transitory computer-readable storage medium as recited in claim 14, further comprising additional instructions which, when executed by the one or more processors, comprise generating one or more navigation packets that conform to the DVD-VR standard.

18. The non-transitory computer-readable storage medium as recited in claim 13, further comprising additional instructions which, when executed by the one or more processors, comprise:
receiving, from a satellite link, digital data that does not conform to the MPEG standard;
converting the digital data to the MPEG data; and
storing the MPEG data onto the hard disk.

19. The non-transitory computer-readable storage medium as recited in claim 18, wherein the received digital data and text data conforms to the DirecTV format.

20. The non-transitory computer-readable storage medium as recited in claim 13, further comprising instructions which, when executed by the one or more processors, comprise:
generating index data that indicates, for each of a plurality of frames contained in the DVD data, a location and timestamp, wherein one or more of the plurality of frames are not at chapter boundaries; and
storing the index data to the DVD.

21. The non-transitory computer-readable storage medium as recited in claim 20, wherein one or more of the plurality of frames are group of pictures (GOP) headers.

22. The non-transitory computer-readable storage medium as recited in claim 20, wherein storing the index data to the DVD includes storing the index data into a directory structure on the DVD.

23. The non-transitory computer-readable storage medium as recited in claim 20, wherein the index data is stored on the DVD in DVD navigation packets.

24. The non-transitory computer-readable storage medium as recited in claim 20, wherein the DVD subpicture graphics data is stored onto the DVD before the DVD data.

25. An apparatus for creating a Digital Versatile Disc (DVD), comprising:
a subsystem that retrieves from a hard disk, MPEG data comprising a plurality of video content that conforms to the MPEG standard;
a subsystem that receives text data that describes one or more attributes for each of the plurality of video content, the text data including at least program names and program summaries for each of the plurality of video content;
a subsystem that generates DVD subpicture graphics data based upon the text data, the subpicture graphics data including at least graphical renderings of each of the program names and program summaries;
a subsystem that converts the plurality of video content into DVD data that conforms to a DVD format;
a subsystem that stores the DVD subpicture graphics data onto a DVD as part of a navigation interface for the plurality of video content, the DVD subpicture graphics data forming a hierarchical menu structure that includes at least a menu that identifies at least first video content by at least a program name and a menu that identifies the first video content by at least a program summary; and a subsystem that stores the DVD data onto the DVD.

26. The apparatus as recited in claim 25, wherein the DVD format is the DVD-VR format and the subsystem that converts the plurality of video content into DVD data that conforms to the DVD format includes a subsystem that converts the plurality of video content into DVD-VR data that conforms to the DVD-VR format.

27. The apparatus as recited in claim 26, wherein the subsystem that converts the plurality of video content into DVD-VR data that conforms to the DVD-VR format includes a subsystem that reformats an MPEG Group of Pictures having more than thirty six display fields into two or more Groups of Pictures that each have at most thirty six display fields.

28. The apparatus as recited in claim 27, wherein the subsystem that reformats an MPEG Group of Pictures having more than thirty six display fields into two or more Groups of Pictures that each have at most thirty six display fields includes a subsystem that constructs one or more intraframes (I-frames) based upon preceding predicted frames (P-Frames) and bidirectional frames (B-frames).

29. The apparatus as recited in claim 26, further comprising a subsystem that generates one or more navigation packets that conform to the DVD-VR standard.

30. The apparatus as recited in claim 25, further comprising:
a subsystem that receives, from a satellite link, digital data that does not conform to the MPEG standard;
a subsystem that converts the digital data to the MPEG data; and
a subsystem that stores the MPEG data onto the hard disk.

31. The apparatus as recited in claim 30, wherein the received digital data and text data conforms to the DirecTV format.

32. The apparatus as recited in claim 25, further comprising:

a subsystem that generates index data that indicates, for each of a plurality of frames contained in the DVD data, a location and timestamp, wherein one or more of the plurality of frames are not at chapter boundaries; and
a subsystem that stores the index data to the DVD.

33. The apparatus as recited in claim 32, wherein one or more of the plurality of frames are group of pictures (GOP) headers.

34. The apparatus as recited in claim 32, wherein the subsystem that stores the index data to the DVD includes a subsystem that stores the index data into a directory structure on the DVD.

35. The apparatus as recited in claim 32, wherein the index data is stored on the DVD in DVD navigation packets.

36. The apparatus as recited in claim 32, wherein the DVD subpicture graphics data is stored onto the DVD before the DVD data.

37. The apparatus as recited in claim 32, wherein the apparatus is a digital video recorder (DVR).

38. The method of claim 1, wherein the hierarchical menu structure is in the form of an electronic program guide comprising a menu listing at least the program names and, for each particular program name of the program names, a menu listing additional information corresponding to the particular program name.

39. The non-transitory computer-readable storage medium as recited in claim 13, wherein the hierarchical menu structure is in the form of an electronic program guide comprising a menu listing at least the program names and, for each particular program name of the program names, a menu listing additional information corresponding to the particular program name.

40. The apparatus as recited in claim 25, wherein the hierarchical menu structure is in the form of an electronic program guide comprising a menu listing at least the program names and, for each particular program name of the program names, a menu listing additional information corresponding to the particular program name.

* * * * *

UNITED STATES PATENT AND TRADEMARK OFFICE
CERTIFICATE OF CORRECTION

| | | |
|---|---|---|
| PATENT NO. | : 8,000,584 B1 | Page 1 of 1 |
| APPLICATION NO. | : 10/958678 | |
| DATED | : August 16, 2011 | |
| INVENTOR(S) | : Andrew Martin Goodman et al. | |

It is certified that error appears in the above-identified patent and that said Letters Patent is hereby corrected as shown below:

COLUMN 10
Claim 1: Line 47 after "graphics data" delete "comprises".

COLUMN 11
Claim 13: Line 52 after "graphics data" delete "comprises".

Signed and Sealed this
Twenty-seventh Day of September, 2011

David J. Kappos
*Director of the United States Patent and Trademark Office*